United States Patent [19]
Shu

[11] Patent Number: 5,209,138
[45] Date of Patent: May 11, 1993

[54] HANDLEBAR ASSEMBLY FOR CYCLES

[76] Inventor: Hung C. Shu, No. 32-1, Lane 10-8, Kuang Hsing Rd., Tai Ping Hsiang, Taichung Hsien, Taiwan

[21] Appl. No.: 913,423

[22] Filed: Jul. 15, 1992

[51] Int. Cl.⁵ .......................................... B62K 21/14
[52] U.S. Cl. ................... 74/551.2; 74/551.1; 403/145; 403/229; 267/150; 267/169; 267/291
[58] Field of Search .............. 74/551.1, 551.3, 551.2, 74/551.5, 551.6; 403/229, 145; 267/4, 150, 169, 286, 291

[56] References Cited

U.S. PATENT DOCUMENTS

| | | | |
|---|---|---|---|
| 564,108 | 7/1896 | Rumbarger | 74/551.2 |
| 564,142 | 7/1896 | Beardsley | 74/551.2 X |
| 797,041 | 8/1905 | Angrove | 74/551.2 |
| 815,188 | 3/1906 | Mans | 267/291 X |
| 864,056 | 8/1907 | Altenburger | 74/551.2 |
| 1,568,911 | 1/1926 | O'Brien | 74/551.2 |
| 1,648,394 | 11/1927 | Gates | 267/291 X |
| 2,099,807 | 11/1937 | Gregory | 267/291 X |
| 4,939,950 | 7/1990 | Girvin | 74/551.2 |

FOREIGN PATENT DOCUMENTS

| | | | |
|---|---|---|---|
| 383481 | 3/1908 | France | 267/286 |
| 543949 | 9/1922 | France | 74/551.2 |
| 567319 | 2/1924 | France | 74/551.2 |
| 468728 | 1/1952 | Italy | 403/229 |
| 63-230940 | 6/1988 | Japan | 267/150 |
| 1-203709 | 8/1989 | Japan | 267/291 |
| 376465 | 7/1932 | United Kingdom | 74/551.2 |

*Primary Examiner*—Leslie A. Braun
*Assistant Examiner*—Andrea Pitts
*Attorney, Agent, or Firm*—Kerkam, Stowell, Kondracki & Clarke

[57] ABSTRACT

A handlebar including a shank, a ring formed integral in the shank, a number of teeth formed in the ring, a rod slidably engaged in the ring, a number of teeth formed on the rod for engagement with the teeth of the ring so as to prevent the rod from rotating relative to the shank, a disc fixed to one end of the rod and a tube coupled to the other end of the rod, and a spring biased between the ring and the disc for cushioning shocks transmitted to the handlebar.

13 Claims, 3 Drawing Sheets

HANDLEBAR ASSEMBLY FOR CYCLES

BACKGROUND OF THE INVENTION

1. Field of the Invention

The present invention relates to a handlebar assembly, and more particularly to a handlebar assembly for cycles.

2. Description of the Prior Art

A typical handlebar having cushioning device is disclosed in U.S. Pat. No. 4,939,950 to Girvin, filed Oct. 24, 1988, entitled "HANDLEBAR ASSEMBLY FOR CYCLES". In this invention, the pivot arm 20 is pivotable about an axis 23, and a rubber spring element 70 is provided for resiliently resisting pivoting movement of the pivot arm to cushion shocks which are transmitted to the column member when bumps are encountered in an irregular roadway or off-road surface. However, when the bicycle bumps on a stone or the like, the pivot arm 20 and the tubular main portion 60 of the handlebar tends to rotate downwards about the axis 23, such that the upper part of the driver also tends to move downwards, thereby, the driver is apt to be "thrown out" of the bicycle.

The present invention has arisen to mitigate and/or obviate the afore-described disadvantages of the conventional handlebars.

SUMMARY OF THE INVENTION

The primary objective of the present invention is to provide a handlebar assembly for cycles in which the handlebar moves forward when the bicycles bumps onto stones and the like.

In accordance with one aspect of the invention, there is provided a handlebar assembly comprising a shank including one end fixed to a post, a ring formed integral in the shank and including a first engaging means formed in an inner peripheral portion thereof, a rod slidably engaged in the ring and including a second engaging means formed in an outer peripheral portion thereof for engagement with the first engaging means so as to limit the rod to slide longitudinally in the shank only, a disc fixed to one end of the rod, a tube coupled to the other end of the rod for supporting a handlebar, and a spring biased between the ring of the shank and the disc for cushioning shocks transmitted to the handlebar assembly.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
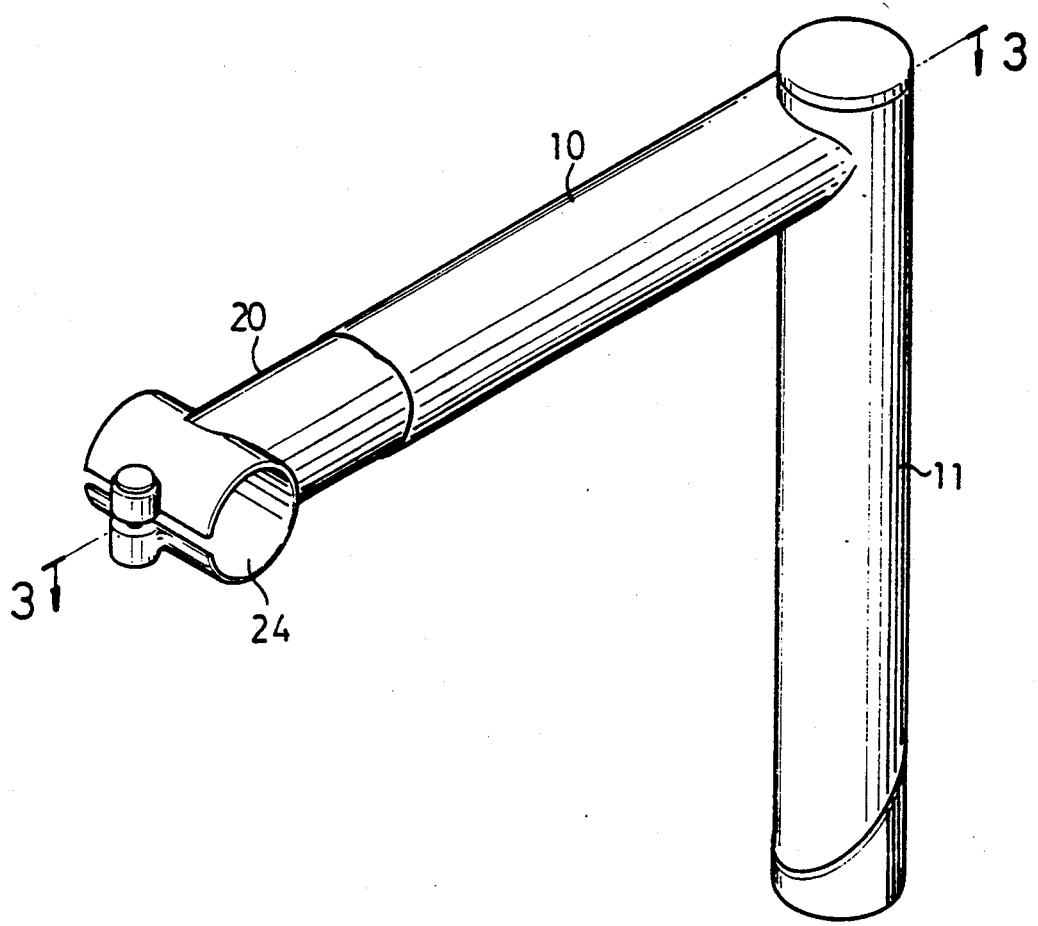
FIG. 1 is a perspective view of a handlebar assembly in accordance with the present invention.
Figure 2:
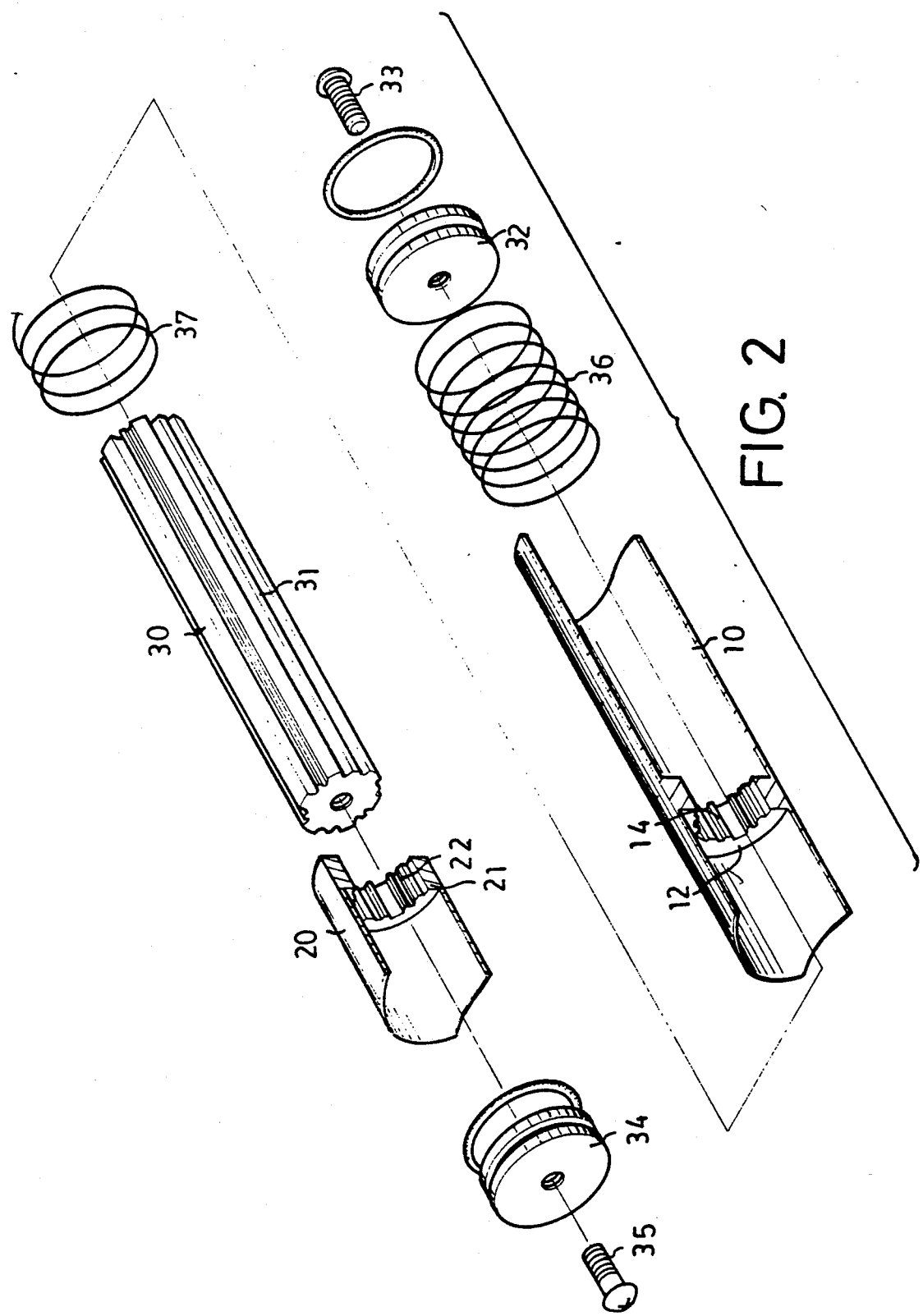
FIG. 2 is an exploded view of the handlebar assembly.
Figure 4:
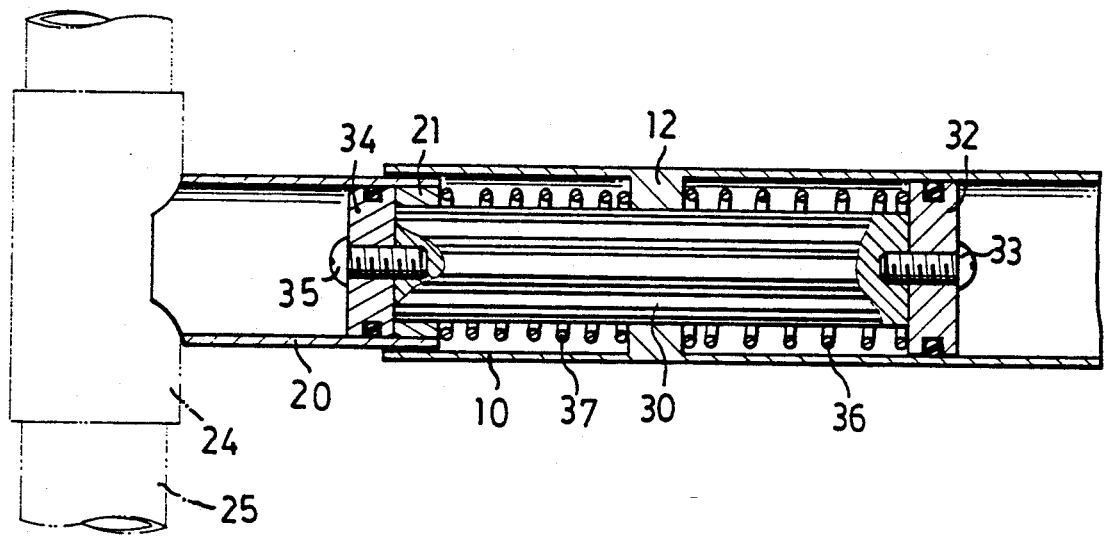
FIGS. 3 and 4 are cross sectional views illustrating the operations of the handlebar assembly.
Figure 3:
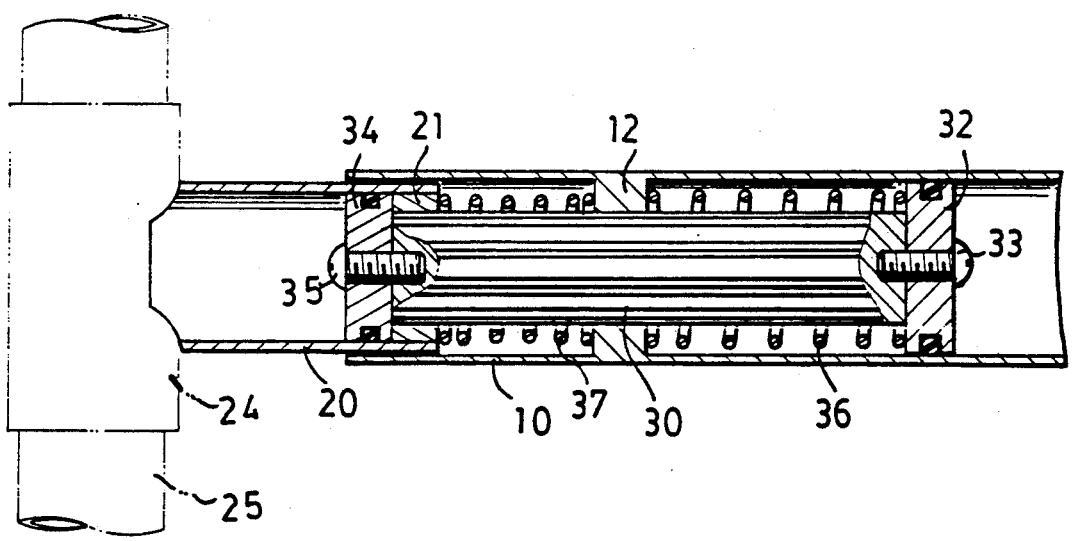

Referring to the drawings, a handlebar assembly in accordance with the present invention comprises generally a shank 10 including a rear end fixed on the upper portion of a post 11 which is normally fixed in the front fork (not shown), the shank 10 includes a ring 12 formed integral in the middle portion, and the ring 12 includes a plurality of teeth or grooves 14 formed in the inner peripheral portion of the ring 12 and in parallel to the longitudinal axis of the shank 10; a tube 20 is disposed in the front end of the shank 10 and preferably has an outer diameter smaller than the inner diameter of the shank 10 such that the tube 20 is slidably engagable in the shank 10, the tube 20 also includes a ring 21 formed integral in the rear end portion thereof and a plurality of teeth or grooves 22 formed in the inner peripheral portion of the ring 21, a sleeve 24 is fixed to the front end of the tube 20 and is perpendicular to the tube 20 for supporting a handlebar 25 (FIG. 3).

A rod 30 is slidably engaged in the rings 12, 21 and includes a plurality of grooves or teeth 31 formed longitudinally on the outer peripheral portion thereof for engagement with the teeth or grooves 14, 22 of the rings 12, 21, such that the rod 30 is guided to move longitudinally along the tube 20 and the shank 10, and such that the tube 20 is prevented from rotating relative to the shank 10. A disc element or a piston 32 is fixed to the rear end of the rod 30 by a bolt 33 and is located in the rear end portion of the shank 10, and another disc element or another piston 34 is fixed to the front end of the rod 30 by a bolt 35 and located in the tube 20, a spring 36 is biased between the ring 12 and the piston 32 for biasing both the rod 30 and the tube 20 rearward of the shank 10, and another spring 37 is biased between the ring 21 of the tube 20 and the ring 12 for preventing the ring 21 from striking the ring 12.

In using, the tube 20 and the handlebar 25 are resiliently held in place and is movable either forward or rearward in order to cushion shocks which are transmitted to the handlebar when bumps are encountered in an irregular roadway or off-road surface such that the users may feel more comfortable. It is to be noted that the handlebar 25 which is grasped by the users moves forward of the shank 10 against the spring 36 when bumps occur, thereby, the forward movement of the user is resiliently resisted and the shocks transmitted to the handlebar is absorbed by the springs 36, 37.

It is to be noted that an enclosed space is formed between the ring 12 and the piston 32 when the piston 32 has an outer diameter large enough to engage with the inner surface of the shank 10 such that the piston 32 is also capable of cushioning the shocks transmitted to the handlebar.

Alternatively, the ring 12 may be formed in the front end of the shank 10 and the ring 21 is formed in the front portion of the tube 20 such that the front end of the shank 10 is slidably engaged in the tube 20; without the ring 21, the tube 20 may be directly fixed to the front end of the rod 30 by the disc 34 which is integrally fixed in the tube 20 such that the tube 20 may also be biased by the spring 37.

Accordingly, the handlebar of the handlebar assembly in accordance with the present invention moves forward and rearward when bumps are encountered in an irregular roadway or off-road surface.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A handlebar assembly comprising a shank including a first end fixed to a post and including a second end, a first ring formed integral with said shank and including a first engaging means formed in an inner peripheral portion thereof, a rod disposed in said shank and slidably engaged in said first ring and including a second engaging means formed in an outer peripheral portion thereof for engagement with said first engaging means so as to prevent said rod from rotating relative to said shank and in order to guide said rod to slide longitudinally in said shank, said rod including a first end located in said first end of said shank and a second end located in said second end of said shank, a first disc fixed to said first end of said rod, a tube coupled to said second end of said rod for supporting a handlebar, and means biased between said first ring of said shank and said first disc for cushioning shocks transmitted to said handlebar assembly.

2. A handlebar assembly according to claim 1, wherein said first engaging means includes at least one tooth longitudinally formed in said inner peripheral portion of said first ring, said second engaging means includes at least one groove longitudinally formed in said outer peripheral portion of said rod for slidably engaging with said tooth of said first ring so that said rod is prevented from rotating relative to said shank and such that said rod is guided to slide longitudinally in said shank.

3. A handlebar assembly according to claim 1, wherein said first engaging means includes at least one groove longitudinally formed in said inner peripheral portion of said first ring, said second engaging means includes at least one tooth longitudinally formed in said outer peripheral portion of said rod for slidably engaging with said groove of said first ring so that said rod is prevented from rotating relative to said shank and such that said rod is guided to slide longitudinally in said shank.

4. A handlebar assembly according to claim 1, wherein said first disc is a piston having an outer peripheral portion slidably engaged with an inner peripheral surface of said shank so as to form an enclosed space between said first ring and said piston in order to cushion shocks transmitted to said handlebar assembly.

5. A handlebar assembly according to claim 1 further comprising a means biased between said tube and said first ring for preventing said tube from striking said first ring.

6. A handlebar assembly according to claim 1, wherein said tube is slidably engaged in said second end of said shank and includes a second ring formed integral therein distal to said handlebar, said second ring includes a third engaging means formed therein for engagement with said second engaging means of said rod such that said tube is prevented from rotating relative to said rod, and a second disc is fixed to said second end of said rod.

7. A handlebar assembly according to claim 6 further comprising a means biased between said second ring and said first ring for preventing said tube from striking said first ring.

8. A handlebar assembly according to claim 6, wherein said second disc is a piston having an outer peripheral portion slidably engaged with an inner peripheral surface of said tube.

9. A handlebar assembly comprising a shank including a first end fixed to a post and including a second end, a first ring formed integral with said shank and including a first engaging means formed in an inner peripheral portion thereof, a rod disposed in said shank and slidably engaged in said first ring and including a second engaging means formed in an outer peripheral portion thereof for engagement with said first engaging means so as to prevent said rod from rotating relative to said shank and in order to guide said rod to slide longitudinally in said shank, said rod including a first end located in said first end of said shank and a second end located in said second end of said shank, a first disc fixed to said first end of said rod, a tube coupled to said second end of said rod for supporting a handlebar, a first biasing means biased between said tube and said first ring, and a second biasing means biased between said first ring of said shank and said first disc for cushioning shocks transmitted to said handlebar assembly.

10. A handlebar assembly according to claim 9, wherein said first engaging means includes at least one tooth longitudinally formed in said inner peripheral portion of said first ring, said second engaging means includes at least one groove longitudinally formed in said outer peripheral portion of said rod for slidably engaging with said tooth of said first ring so that said rod is prevented from rotating relative to said shank and such that said rod is guided to slide longitudinally in said shank.

11. A handlebar assembly according to claim 9, wherein said first engaging means includes at least one groove longitudinally formed in said inner peripheral portion of said first ring, said second engaging means includes at least one tooth longitudinally formed in said outer peripheral portion of said rod for slidably engaging with said groove of said first ring so that said rod is prevented from rotating relative to said shank and such that said rod is guided to slide longitudinally in said shank.

12. A handlebar assembly according to claim 9, wherein said first disc is a piston having an outer peripheral portion slidably engaged with an inner peripheral surface of said shank so as to form an enclosed space between said first ring and said piston in order to cushion shocks transmitted to said handlebar assembly.

13. A handlebar assembly according to claim 9, wherein said tube is slidably engaged in said second end of said shank and includes a second ring formed integral therein distal to said handlebar, said second ring includes a third engaging means formed therein for engagement with said second engaging means of said rod such that said tube is prevented from rotating relative to said rod, and a second disc is fixed to said second end of said rod, said first biasing means is biased between said second ring and said first ring.

* * * * *